(12) United States Patent  (10) Patent No.: US 10,144,160 B2
Cheng  (45) Date of Patent: Dec. 4, 2018

(54) METHOD FOR MANUFACTURING A WATERTIGHT ZIPPER

(71) Applicant: UNITECH ZIPPER & MACHINERY CO., LTD., New Taipei (TW)

(72) Inventor: Jung-Yuan Cheng, New Taipei (TW)

(73) Assignee: Unitech Zipper & Machinery Co., Ltd., New Taipei (TW)

( * ) Notice: Subject to any disclaimer, the term of this patent is extended or adjusted under 35 U.S.C. 154(b) by 312 days.

(21) Appl. No.: 15/088,216

(22) Filed: Apr. 1, 2016

(65) Prior Publication Data

US 2017/0266856 A1    Sep. 21, 2017

(30) Foreign Application Priority Data

Mar. 17, 2016  (TW) .............................. 105108314 A

(51) Int. Cl.
| | |
|---|---|
| A44B 19/32 | (2006.01) |
| B29C 45/00 | (2006.01) |
| A44B 19/08 | (2006.01) |
| A44B 19/40 | (2006.01) |
| A44B 19/42 | (2006.01) |
| B29D 5/02 | (2006.01) |
| B29L 31/00 | (2006.01) |

(52) U.S. Cl.
CPC .............. *B29C 45/00* (2013.01); *A44B 19/08* (2013.01); *A44B 19/32* (2013.01); *A44B 19/403* (2013.01); *A44B 19/42* (2013.01); *B29D 5/02* (2013.01); *B29L 2031/7276* (2013.01)

(58) Field of Classification Search
CPC ............................... B29C 45/00; A44B 19/08
See application file for complete search history.

(56) References Cited

U.S. PATENT DOCUMENTS

| | | |
|---|---|---|
| 2,910,754 A | 11/1959 | Morin |
| 4,765,038 A | 8/1988 | Kasai |
| 7,337,506 B2 | 3/2008 | Kusayama et al. |
| 8,091,187 B2 | 1/2012 | Takazawa et al. |

(Continued)

FOREIGN PATENT DOCUMENTS

| | | |
|---|---|---|
| EP | 1568290 A2 | 8/2005 |
| TW | 200304785 A | 10/2003 |
| TW | 200847955 A | 12/2008 |

*Primary Examiner* — Edmund H Lee
*Assistant Examiner* — Nicholas R Krasnow
(74) *Attorney, Agent, or Firm* — Alan D. Kamrath; Kamrath IP Lawfirm, P.A.

(57) ABSTRACT

A method for manufacturing a watertight zipper includes forming a waterproof tape by extruding a polymeric material in a melted state wrapping around a cloth tape, cutting a side of the waterproof tape that is covered by the thick waterproof layer to form a side surface of the thick waterproof layer as an abutting surface, forming a plurality of apertures in the waterproof tape that extends through the cloth tape and the thick waterproof layer, and forming a plurality of scoops spaced from the thin waterproof layer and corresponding to the apertures. The waterproof tape includes a thick waterproof layer and a thin waterproof layer both formed by the polymeric material. The thick waterproof layer covers an upper surface, a lower surface and an edge of the cloth tape. The thin waterproof layer connects with the thick waterproof layer. An end of each scoop extends beyond the abutting surface.

7 Claims, 10 Drawing Sheets

(56) References Cited

U.S. PATENT DOCUMENTS

| | | |
|---|---|---|
| 2004/0237266 A1 | 12/2004 | Wang |
| 2006/0016051 A1 | 1/2006 | Wang et al. |
| 2009/0282665 A1* | 11/2009 | Cossutti .................. A44B 19/32 29/408 |
| 2010/0154179 A1* | 6/2010 | Blackford .............. A44B 19/26 24/399 |
| 2012/0246886 A1* | 10/2012 | Matsumoto ............ A44B 19/32 24/381 |
| 2013/0232738 A1* | 9/2013 | Tominaga .............. A44B 19/32 24/435 |

* cited by examiner

METHOD FOR MANUFACTURING A WATERTIGHT ZIPPER

CROSS REFERENCE TO RELATED APPLICATIONS

The application claims the benefit of Taiwan application serial No. 105108314, filed on Mar. 17, 2016, and the subject matter of which is incorporated herein by reference.

BACKGROUND OF THE INVENTION

1. Field of the Invention

The present invention generally relates to a method for manufacturing a zipper and, more particularly, to a method for manufacturing a watertight zipper that can effectively prevent penetration of liquid.

2. Description of the Related Art

With references to FIGS. 1 and 2, a conventional watertight zipper 9 has a waterproof tape 91 made of an elastic material. The waterproof tape 91 has a sheet portion 91a and an enlarged edge portion 91b, with the enlarged edge portion 91b connected to an edge of the sheet portion 91a. The thickness of the enlarged edge portion 91b is larger than the thickness of the sheet portion 91, forming upper and lower shoulders 911 and 912 at the junction of the sheet portion 91a and the enlarged edge portion 91b. A free end of the enlarged edge portion 91b forms an abutting surface 913. The waterproof tape 91 includes apertures 92 spaced out and extending through the sheet portion 91a. A scoop 93 is formed at each aperture 92, with upper and lower teeth of the scoop 93 extending into the aperture 92 to connect with each other. The upper tooth of each scoop 93 abuts against the upper shoulder 911 of the waterproof tape 91, and the lower tooth of each scoop 93 abuts against the lower shoulder 912 of the waterproof tape 91. Free ends of the upper and lower teeth of the scoop 93 extend beyond the enlarged edge portion 91b, with the abutting surface 913 of the enlarged edge portion 91b sandwiched between the upper and lower teeth of the scoop 93. As such, when the conventional watertight zipper 9 is fastened and the scoops 93 of left and right stringers are engaged with each other, the enlarged edge portions 91b of the left and right stringers abut against each other via their abutting surfaces 913, thus preventing penetration of liquid through a void between the scoops 93 of the left and right stringers. An embodiment similar to the conventional watertight zipper 9 is disclosed in U.S. Pat. No. 2,910,754.

When manufacturing the conventional watertight zipper 9, an injection molding process and an extrusion process are widely used. Concerning the injection molding process, the size of the mold directly limits the length of the waterproof tape 91. That is, each mold can only produce waterproof tapes 91 in one size. When the waterproof tape 91 with a longer length is required, it must be manufactured by repeating the injection molding steps. Namely, after the initially formed waterproof tape 91 cools down, the injection molding step is repeated once more to lengthen the waterproof tape 91, and further injection molding steps may be necessary according to the demand in total length of the waterproof tape 91. Though repeating the injection molding steps can form the upper and lower shoulders 911 and 912 of the waterproof tape 91 with a plane finish and parallel to the abutting surface 913, a part of a section formed by a previous injection molding step is pressed by the mold when a later injection molding step is performed to form the next section, thus said part is deformed. Besides, since the section formed by the previous injection molding step is already solidified and the material for forming the next section by the later injection molding step is still in a liquid state, a linear protrusion usually forms at the overlap area of said adjacent sections. Consequently, penetration of liquid may easily occur at the overlap area.

Furthermore, when forming the waterproof tape 91 having a cloth tape embedded inside, since it is hard for the cloth tape to be steadily positioned inside the mold, the polymeric material cannot completely wrap around the cloth tape by the injection molding step. Hence, the waterproof tape 91 having the cloth tape embedded inside must be manufactured through the extrusion process. The extrusion process can produce the waterproof tape 91 with the cloth tape embedded inside in a continuous manner. The scoops 93 with the required size are then formed onto the waterproof tape 91 by injection molding, thus improving production efficiency. Besides, deformation or linear protrusion mentioned previously due to continuous injection molding steps will surely not occur. However, concerning the long waterproof tape 91 formed by extrusion, it is hard to form the upper and lower shoulders 911 and 912 with a plane surface and parallel to the abutting surface 913. Consequently, leakage of material may still occur during the formation of the scoops 93, which also adversely affects the yield of the scoops 93.

For this reason, a manufacturer tends to produce the waterproof tape with an even thickness by extrusion. Such a waterproof tape can be utilized for production of a continuous watertight zipper, and leakage of material during formation of the scoops can be avoided. An embodiment similar to such manufacturing method is disclosed in U.S. Pat. No. 7,337,506 B2. However, the waterproof tape having an uneven thickness can form the enlarged abutting surface with its thicker portion, resulting in an improved watertight effect. When the waterproof tape having an uneven thickness is coupled to waterproof leathers or clothes via its thinner portion, the thinner portion softer than the thicker portion can have a flexibility similar to that of the thin and soft waterproof leathers or clothes, improving the quality of the watertight product. With this concern, the waterproof tape having an uneven thickness is still a preferred choice. Hence, the conventional method for manufacturing the watertight zipper needs improvement that can solve the above mentioned problems for producing the watertight zipper with better performance.

On another aspect, with references to FIGS. 1 and 2, when the watertight zipper is fastened and the scoops 93 of the left and right stringers engage with each other, the abutting surfaces 913 of the enlarged edge portions 91b on the left and right stringers must be pressed until the abutting surfaces 913 slightly deform for achieving a sealing effect. However, since the upper and lower teeth of each scoop 93 extend along two opposite surfaces of the enlarged edge portion 91b, the distance "d" between free ends of the upper and lower teeth of each scoop 93 is the same as the width "w" of the abutting surface 913 of the enlarged edge portion 91b. As a result, when the abutting surfaces 913 of the left and right stringers abut against each other, there is no space for the enlarged edge portions 91b of the left and right stringers to slightly deform, adversely affecting its sealing function.

In light of the above, it is needed to improve the conventional method for manufacturing the watertight zipper.

SUMMARY OF THE INVENTION

It is therefore the objective of this invention to provide a method for manufacturing a watertight zipper which produces a waterproof tape having an uneven thickness by extrusion and assures that leakage of material will not occur during injection molding of scoops.

The present invention provides the method for manufacturing the watertight zipper which assures abutting surfaces of the watertight zipper in a plane form and which provides excellent sealing function when the watertight zipper is in a fastened state.

A method for manufacturing a watertight zipper according to the present invention includes: forming a waterproof tape by extruding a polymeric material in a melted state wrapping around an outer surface of a cloth tape, cutting a side of the waterproof tape that is covered by the thick waterproof layer by laser to form a side surface of the thick waterproof layer in a plane form as an abutting surface, forming a plurality of apertures at the waterproof tape, with each of the plurality of apertures extending through the cloth tape and the thick waterproof layer, and forming a plurality of scoops corresponding to the plurality of apertures by injection molding. The waterproof tape includes a thick waterproof layer and a thin waterproof layer both formed by the polymeric material in a solidified state. The thick waterproof layer covers an upper surface, a lower surface, and an edge extending between the upper and lower surfaces of the cloth tape. The thin waterproof layer connects with the thick waterproof layer. Each of the plurality of scoops is spaced from the thin waterproof layer. An end of each of the plurality of scoops extends beyond the abutting surface of the thick waterproof layer.

The method for manufacturing the watertight zipper of the present invention produces the waterproof tape through extrusion, with each of the scoops not extending to the thin waterproof layer. As such, leakage of material during injection molding of the scoops can be certainly avoided. On the premise that the yield of the scoops is assured, the waterproof tape having an uneven thickness can further improve performance of the watertight zipper utilizing its thickness differences. Besides, the method for manufacturing the watertight zipper of the present invention cuts the side of the waterproof tape by laser, assuring the abutting surface is in a plane form. Besides, since there is space for the thick waterproof layer to slightly deform and since the abutting surface is in a plane form, the abutting surface of the left and right waterproof tapes can be closely abutted with each other without a void, to provide excellent sealing function in a fastened state, improving the watertight function of the watertight zipper.

In a form shown, the method for manufacturing the watertight zipper further includes cutting another side of the waterproof tape that is covered by the thin waterproof layer by laser after forming the waterproof tape. As such, two side surfaces of the waterproof tape are in a plane form, improving convenience and precision levelling of positioning of the waterproof tape in the mold.

In the form shown, each of the plurality of scoops includes an upper tooth and a lower tooth. The upper and lower teeth connect with each other via a portion filled in the aperture. A distance between free ends of the upper and lower teeth is larger than the width of the abutting surface of the thick waterproof layer. As such, a sealing effect of the watertight zipper is improved.

In the form shown, the method for manufacturing the watertight zipper further includes deglossing the thin waterproof layer before forming the plurality of scoops, such that the watertight zipper is provided with a quality appearance. Besides, the thin waterproof layer can be deglossed before cutting the side of the waterproof tape by laser. As such, the abutting surface of the thick waterproof layer can be assured to be in a plane form.

In another form shown, the method for manufacturing the watertight zipper further includes deglossing the thick waterproof layer and the thin waterproof layer before forming the plurality of apertures. Besides, the thick waterproof layer and the thin waterproof layer can be deglossed before cutting the side surface of the waterproof tape by laser, such that the appearances of the thick waterproof layer and the thin waterproof layer can be coherent.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
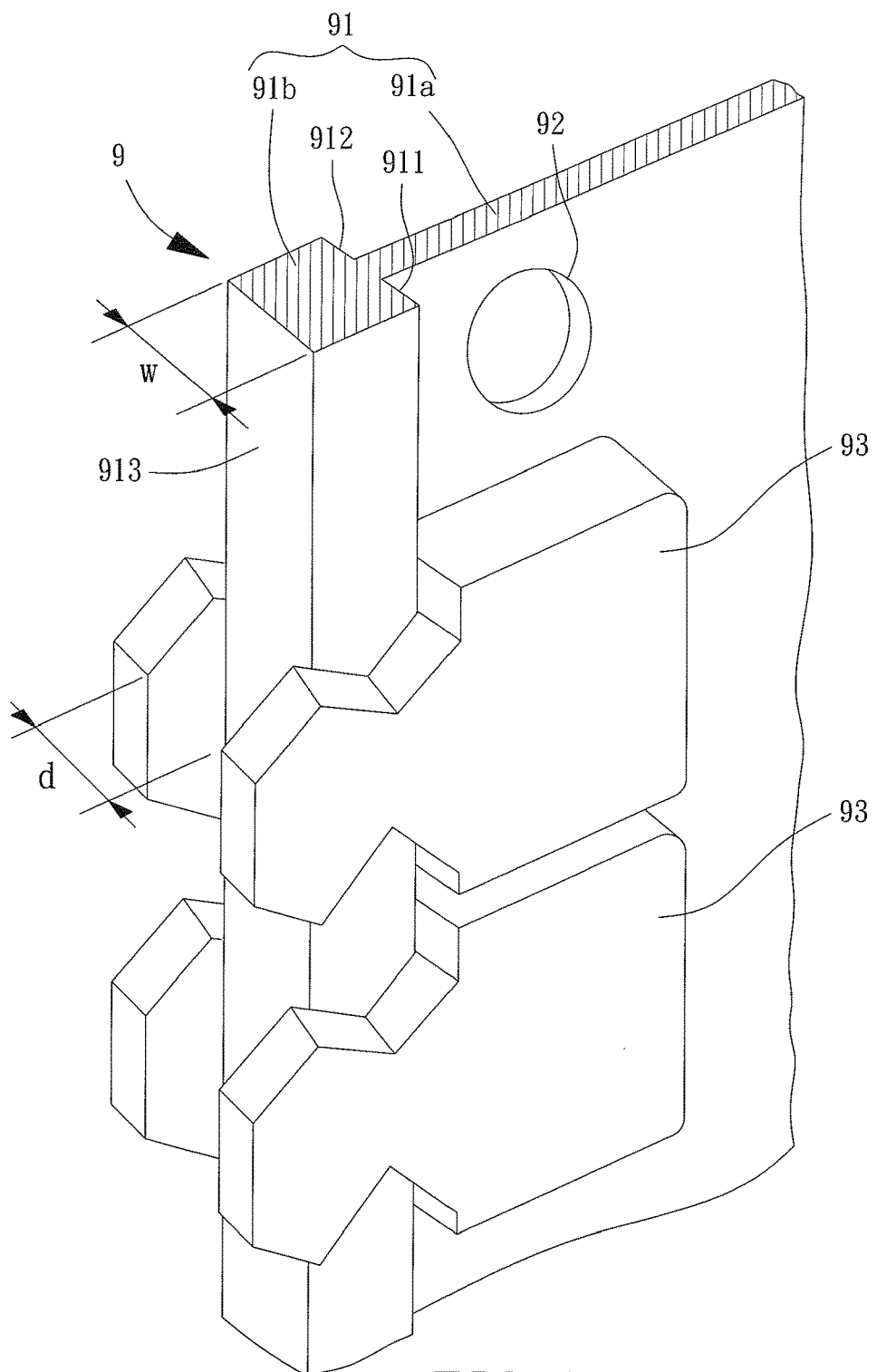
FIG. 1 is a perspective view of a conventional watertight zipper.
Figure 2:
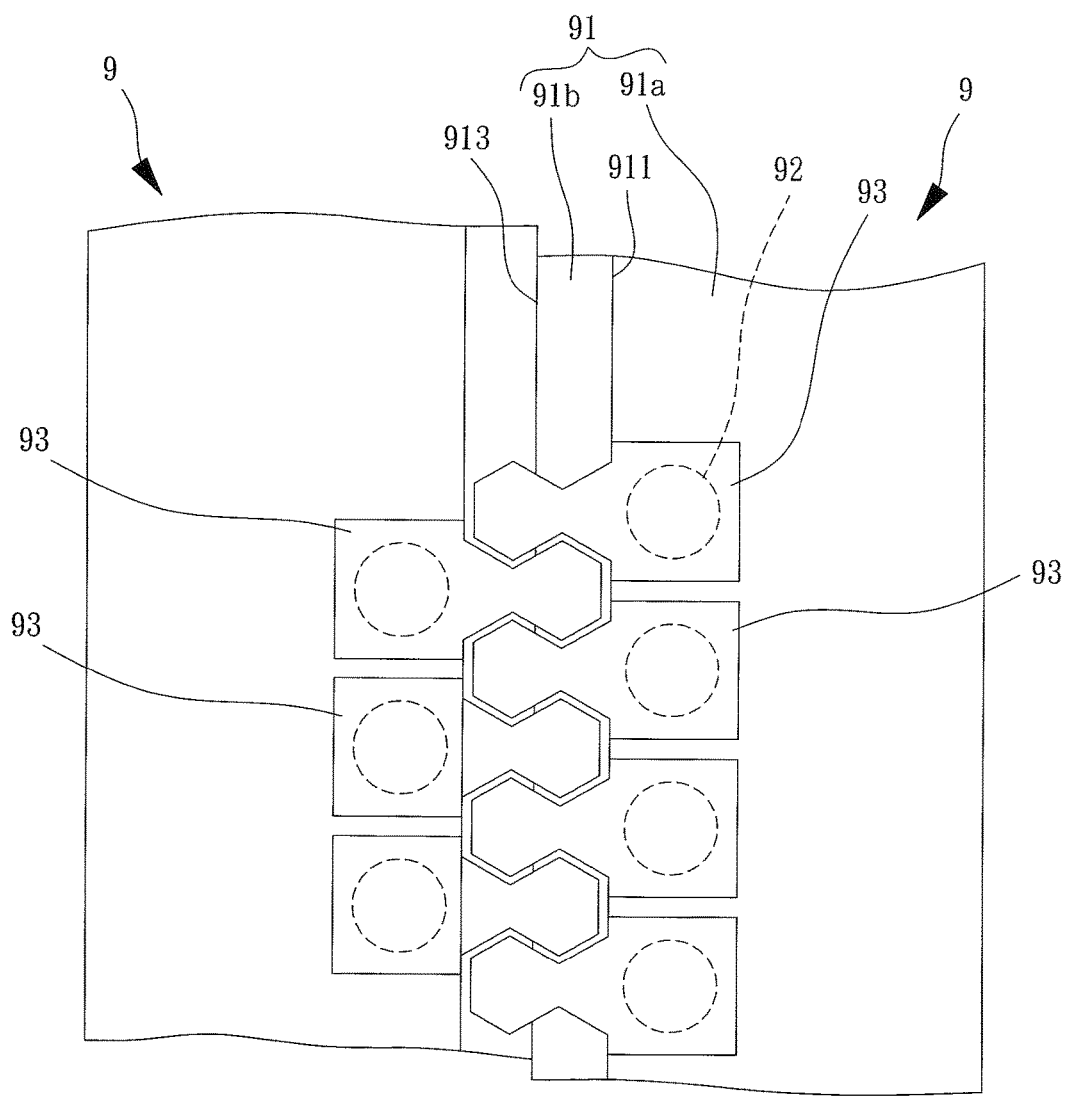
FIG. 2 is a plane view of a conventional watertight zipper in a fastened state.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

A method for manufacturing a watertight zipper according to an embodiment of the present invention includes the following steps.

Figure 3:
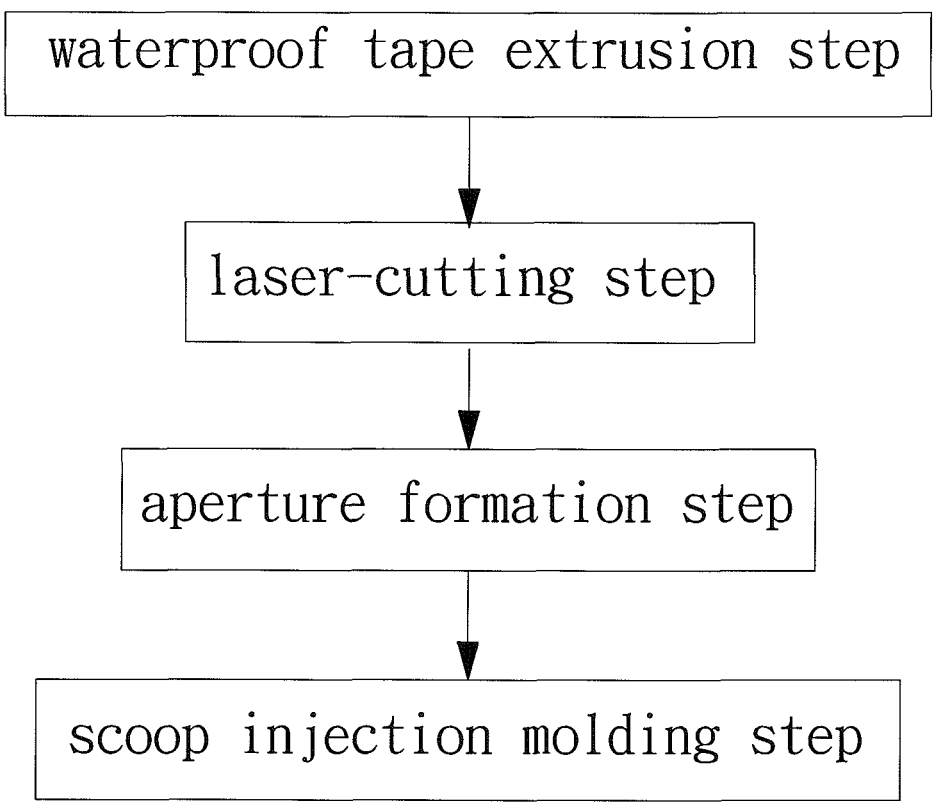
FIG. 3 is a flow chart of an embodiment of the present invention.
Figure 4:
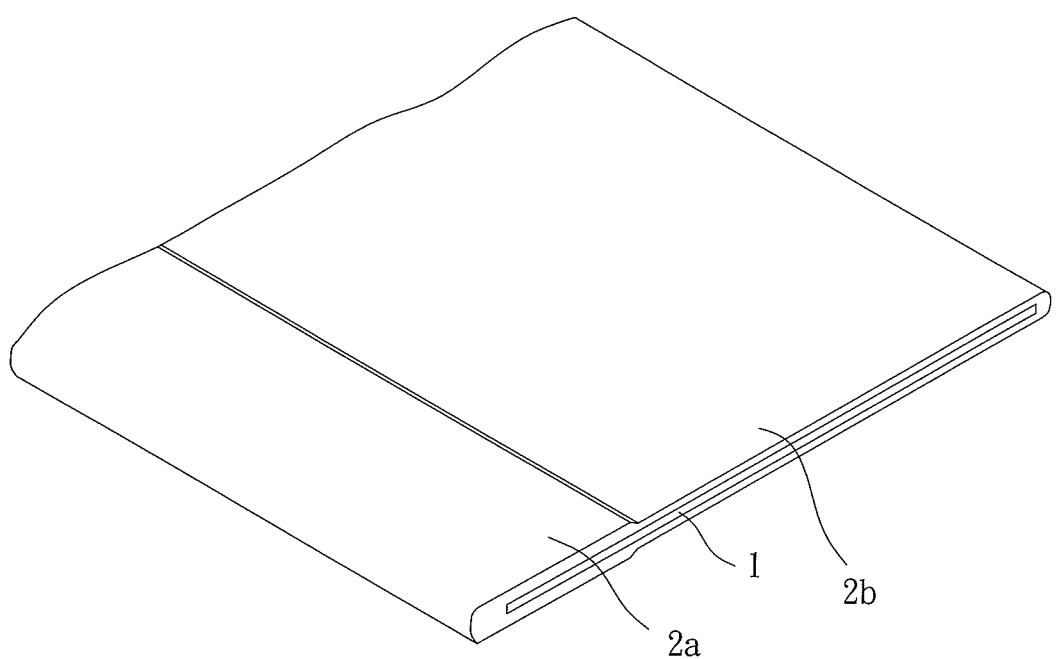
FIG. 4 is a partial, perspective view of a waterproof tape made through an extrusion process according to the embodiment of the present invention.

With references to FIGS. 3 and 4, a polymeric material is initially heated to melt. Then, the melted polymeric material is extruded to cover an outer surface of a cloth tape 1, to form a waterproof tape. In this way, the waterproof tape can prevent liquid permeation between its two opposite surfaces and can be manufactured in a continuous manner with a high production efficiency. Specifically, the waterproof tape includes a thick waterproof layer 2a and a thin waterproof layer 2b, with both of them formed by the solidified polymeric material. The thick waterproof layer 2a covers an edge and parts of the upper and lower surfaces of the cloth tape 1 (according to the orientation shown in FIGS. 3 and 4). The thin waterproof layer 2b connects with the thick waterproof layer 2a. The thin waterproof layer 2b may cover the other edge and the other parts of the upper and lower surfaces of the cloth tape 1. Alternatively, the thin waterproof layer 2b may only cover the other part of the upper surface or the lower surface of the cloth tape 1. Namely, the covered part of the cloth tape 1 is changeable as long as the thin waterproof layer 2b can prevent liquid permeation from the upper surface to the lower surface of the waterproof tape.

Figure 5:
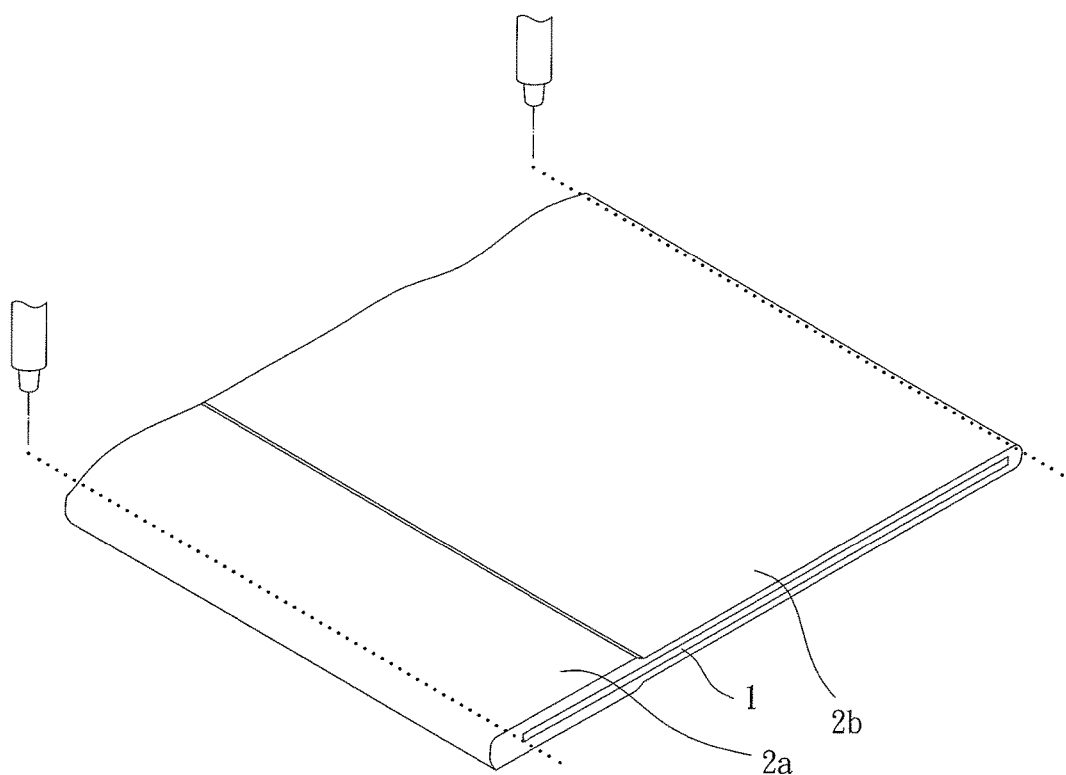
FIG. 5 shows cutting the waterproof tape by laser according to the embodiment of the present invention.
Figure 6:
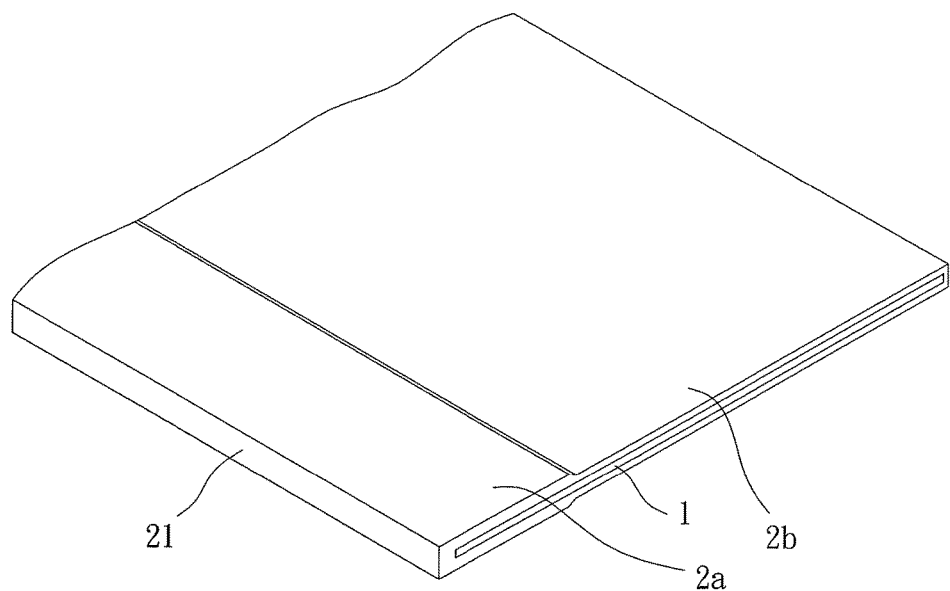
FIG. 6 is a partial, perspective view of the cut waterproof tape according to the embodiment of the present invention.

FIGS. 3, 5 and 6 show cutting a side of the waterproof tape which is covered by the thick waterproof layer 2a by laser, to make a side surface of the thick waterproof layer 2a in a plane form as an abutting surface 21. That is, the present invention utilizes a highly precise laser-cutting process to assure that the side surface of the thick waterproof layer 2a can be cut in a plane form. Preferably, another side of the waterproof tape is also cut by laser, such that two side surfaces of the waterproof tape are in a plane form, improving convenience and precision levelling of positioning of the waterproof tape in the mold. The two sides of the waterproof tape can be cut simultaneously or sequentially.

Figure 7:
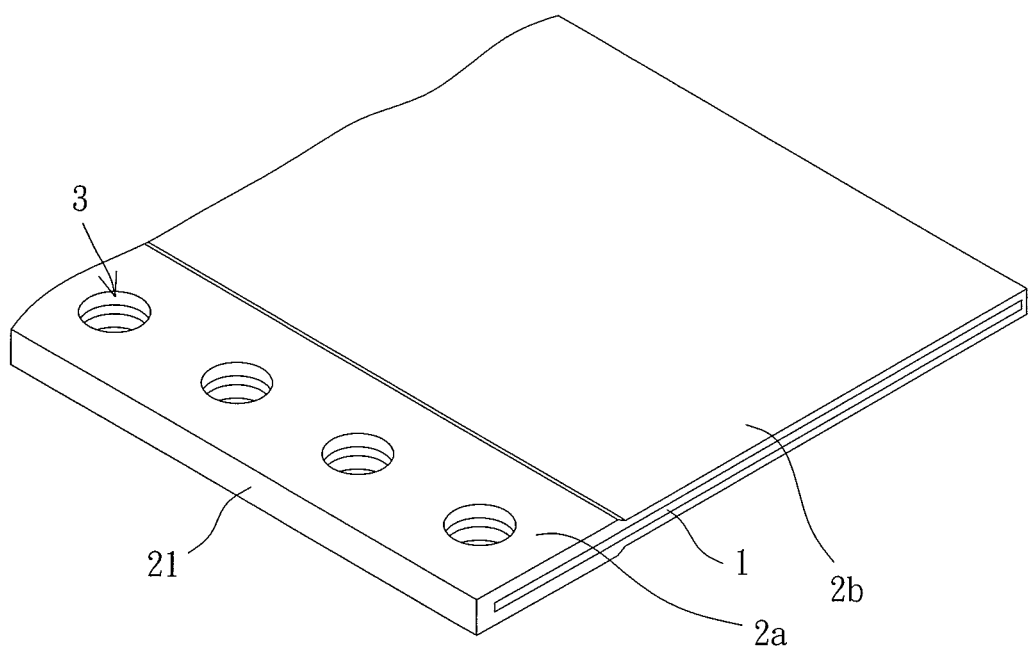
FIG. 7 shows forming apertures on the waterproof tape according to the embodiment of the present disclosure.

With references to FIGS. 3 and 7, a plurality of apertures 3 is arranged in the waterproof tape, with each aperture 3 extending through the cloth tape 1 and the thick waterproof layer 2a. The cross section of the aperture 3 is not limited in the present invention; for instance, it can be in circular form or other shapes.

Figure 8:
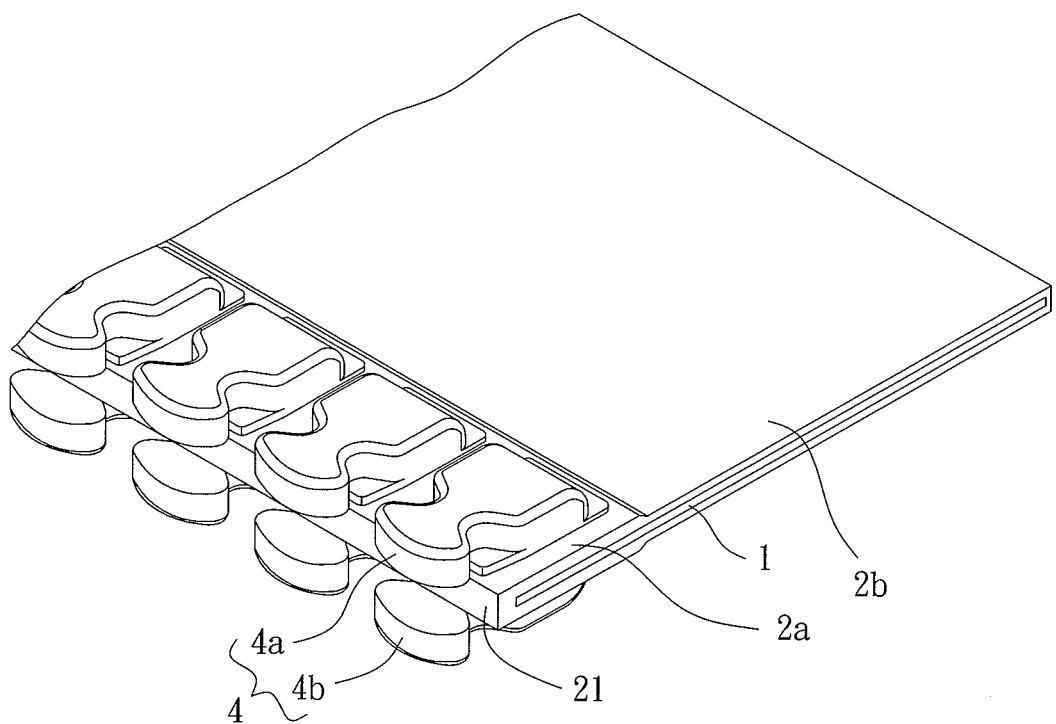
FIG. 8 is a partial, perspective view of the waterproof tape with injection molded scoops according to the embodiment of the present invention.
Figure 9:
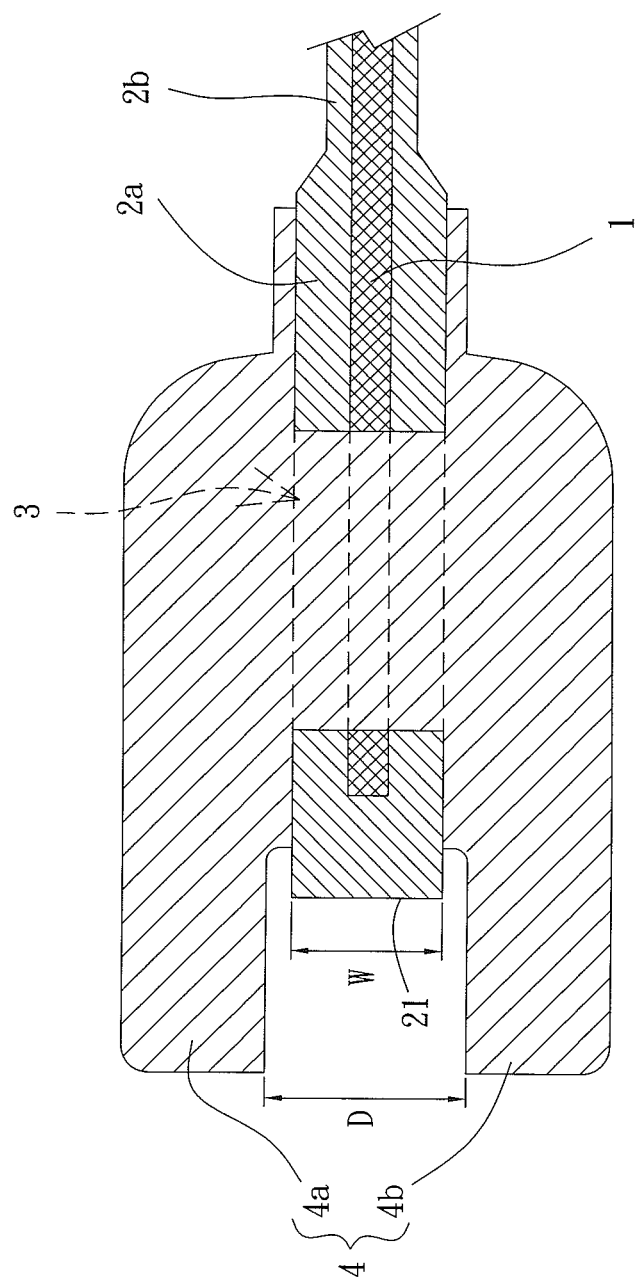
FIG. 9 is a side cross sectional view of the waterproof tape with the injection molded scoops according to the embodiment of the present invention.

Next, with references to FIGS. 3, 8 and 9, a plurality of scoops 4 is injection molded corresponding to the plurality of apertures 3. Each of the scoops 4 is spaced from the thin waterproof layer 2b. Namely, each of the scoops 4 does not extend to the thin waterproof layer 2b. In addition, an end of each scoop 4 extends beyond the abutting surface 21 of the thick waterproof layer 2a. Specifically, the waterproof tape having the plurality of apertures 3 can be placed in a mold, and the mold cavity of the mold is filled with a melted plastic material, such that the melted plastic material occupies the plurality of apertures 3 and then is solidified to form the plurality of scoops 4. Each scoop 4 includes an upper tooth 4a and a lower tooth 4b, with the upper and lower teeth 4a and 4b connecting with each other via a portion filled in the aperture 3. Besides, a distance "D" between free ends of the upper and lower teeth 4a and 4b is larger than the width "W" of the abutting surface 21 of the thick waterproof layer 2a.

In addition, each scoop 4 is preferably made of the plastic material with a melting point higher than that of the polymeric material, such that the polymeric material may be softened and slightly melted when forming each scoop 4, resulting in the scoops 4 being coupled with the thick waterproof layer 2a. Consequently, the engagement strength and tightness between the scoops 4 and the thick waterproof layer 2a can be enhanced, preventing penetration of liquid through a void between each scoop 4 and the thick waterproof layer 2a.

Moreover, since each scoop 4 of the present invention is arranged at the thick waterproof layer 2a without extending to the thin waterproof layer 2b, the portion connected between the upper and lower teeth 4a and 4b can be provided with an enlarged contact area with the waterproof tape, which is sufficient for firmly engaging the entire scoop 4 with the waterproof tape. Besides, since the scoop 4 does not extend to the thin waterproof layer 2b, even if the junction of the thick waterproof layer 2a and the thin waterproof layer 2b is not provided with a smooth finish due to the extrusion process, leakage of material is still avoided when injection molding the scoops 4. On the premise that the yield of the scoops 4 is assured, the waterproof tape having an uneven thickness can further improve performance of the watertight zipper. Specifically, the thick waterproof layer 2a forms the abutting surface 21 with an enlarged area for improving the watertight function. When the watertight zipper is coupled with waterproof leathers or clothes, the thin waterproof layer 2b, which is softer and thinner, can have a flexibility similar to that of the thin and soft waterproof leathers or clothes. As such, the quality of the watertight product can be improved.

Figure 10:
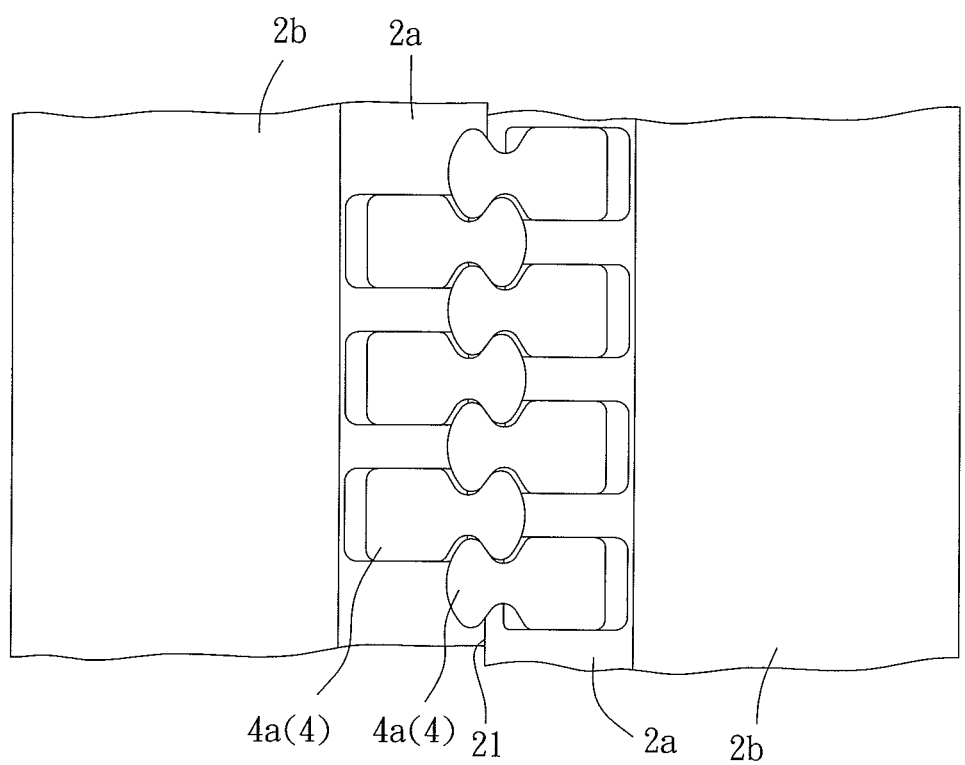
FIG. 10 is a partial, perspective view of the watertight zipper according to the embodiment of the present invention with the scoops of left and right stringers engaged with each other.

With references to FIG. 10, the watertight zipper of the present invention can be produced through the above mentioned steps. When the watertight zipper of the present invention is fastened and the scoops 4 of the left and right stringers are engaged with each other, the corresponding left and right waterproof tapes can abut against each other via the abutting surfaces 21 in a plane form. Besides, since the distance "D" between the free ends of the upper and lower teeth 4a and 4b is larger than the width "W" of the abutting surface 21 of the thick waterproof layer 2a, there is a space for the thick waterproof layers 2a to slightly deform. The waterproof tapes of the left and right stringers can be closely abutted against each other without a void, to prevent penetration of liquid through a void between the scoops 4 of the left and right stringers, providing an excellent sealing effect.

Figure 11:
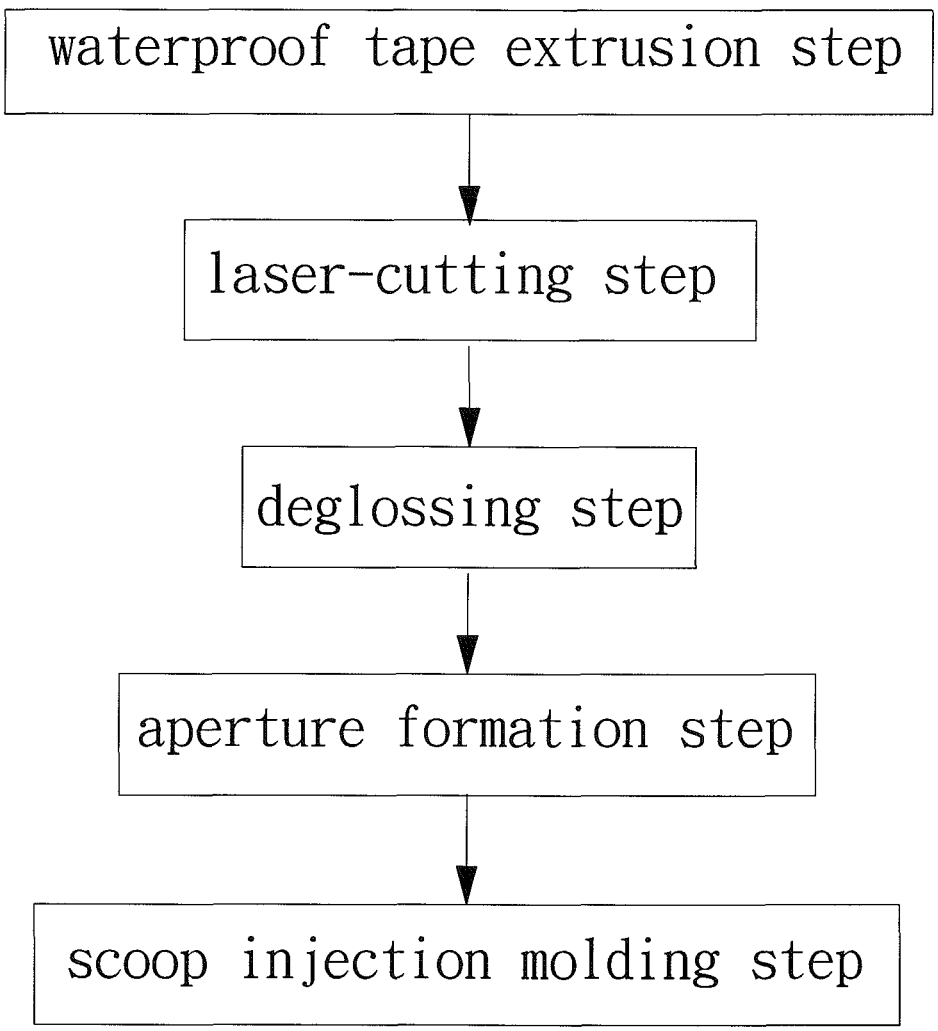
FIG. 11 is a flow chart of another embodiment of the present invention.
Figure 12:
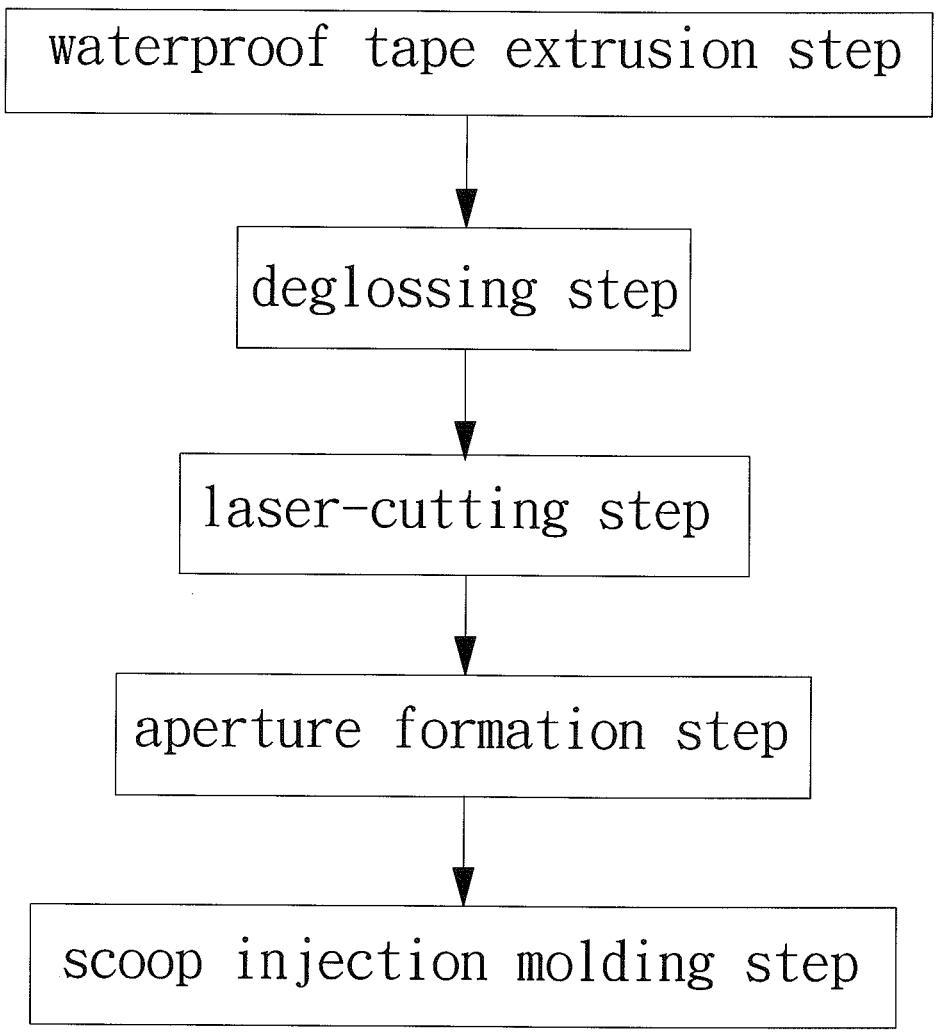
FIG. 12 is a flow chart of still another embodiment of the present invention.

With references to FIGS. 6 and 11, according to another embodiment of the present invention, the method for manufacturing the watertight zipper may further include deglossing the thin waterproof layer 2b before forming the plurality of apertures 3. For instance, before forming the apertures 3, the waterproof tape can be heated for softening the thin waterproof layer 2b, and then the thin waterproof layer 2b is embossed by an emboss roller. After cooling down the waterproof tape, the surface thereof presents a deglossed finish without a glossy look, such as a matte or striped surface. Through this process, the produced watertight zipper is provided with a quality appearance. Accordingly, the deglossing step may be conducted after cutting the side of the waterproof tape by laser. However, preferably, as shown in FIG. 12, the deglossing step is conducted earlier to the thin waterproof layer 2b before the laser-cutting step. In this way, even if a burr edge is unfortunately caused by the deglossing step, the burr edge can be cut off during the laser-cutting step, and the abutting surface 21 of the thick waterproof layer 2a can be assured to be in a plane form. Preferably, the deglossing step may also be conducted to the thick waterproof layer 2a, such that the appearances of the thick waterproof layer 2a and the thin waterproof layer 2b can be coherent.

In summary, the method for manufacturing the watertight zipper of the present invention produces the waterproof tape through extrusion, with each of the scoops not extending to the thin waterproof layer. As such, leakage of material during injection molding of the scoops can be certainly avoided. On the premise that the yield of the scoops is assured, the waterproof tape having an uneven thickness can further improve performance of the watertight zipper utilizing its thickness differences.

Furthermore, the method for manufacturing the watertight zipper of the present invention cuts the side of the waterproof tape by laser, assuring the abutting surface to be in a plane form. Besides, since there is space for the thick waterproof layer to slightly deform and since the abutting surfaces are in a plane form, the abutting surfaces of the left and right waterproof tapes can be closely abutted with each other without a void, to provide excellent sealing function in a fastened state, improving the watertight function of the watertight zipper.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for manufacturing a watertight zipper, comprising:
    forming a waterproof tape by extruding a polymeric material in a melted state wrapping around an outer surface of a cloth tape, wherein the waterproof tape comprises a thick waterproof layer and a thin waterproof layer both formed by the polymeric material in a solidified state, wherein the thick waterproof layer has a thickness greater than a thickness of the thin waterproof layer, wherein the thick waterproof layer covers an upper surface, a lower surface, and an edge extending between the upper and lower surfaces of the cloth tape, and wherein the thin waterproof layer integrally connects with the thick waterproof layer and extends therefrom away from the edge of the cloth tape;
    cutting a side of the thick waterproof layer at the edge of the cloth tape by laser to form a side surface of the thick waterproof layer in a plane form as an abutting surface;
    forming a plurality of apertures at the waterproof tape, wherein each of the plurality of apertures extends through the upper and lower surfaces of the cloth tape and the thick waterproof layer; and
    forming a plurality of scoops at the edge of the cloth tape where the thick waterproof layer is formed, wherein the plurality of scoops corresponds to the plurality of apertures by injection molding, wherein each of the plurality of scoops is spaced from the thin waterproof layer, and wherein an end of each of the plurality of scoops extends beyond the abutting surface of the thick waterproof layer.

2. The method for manufacturing the watertight zipper as claimed in claim 1, further comprising cutting another side of the waterproof tape, which is opposite to the abutting surface and covered by the thin waterproof layer, by laser after forming the waterproof tape.

3. The method for manufacturing the watertight zipper as claimed in claim 1, wherein each of the plurality of scoops comprises an upper tooth and a lower tooth, wherein the upper and lower teeth connect with each other via a portion filled in a corresponding one of the plurality of apertures, and wherein a distance between free ends of the upper and lower teeth is larger than a width of the abutting surface of the thick waterproof layer.

4. The method for manufacturing the watertight zipper as claimed in claim 1, further comprising deglossing the thin waterproof layer before forming the plurality of scoops.

5. The method for manufacturing the watertight zipper as claimed in claim 4, wherein deglossing the thin waterproof layer comprises deglossing before cutting the side of the thick waterproof layer by laser.

6. The method for manufacturing the watertight zipper as claimed in claim 1, further comprising deglossing the thick waterproof layer and the thin waterproof layer before forming the plurality of apertures.

7. The method for manufacturing the watertight zipper as claimed in claim 6, wherein deglossing the thick waterproof layer and the thin waterproof layer comprises deglossing before cutting the side of the thick waterproof layer by laser.

* * * * *